(12) United States Patent
Brown (10) Patent No.: US 7,097,020 B2
(45) Date of Patent: Aug. 29, 2006

(54) THROWOUT BEARING LEVER WITH DYNAMIC ADJUSTABLE WEIGHT ASSEMBLY

(76) Inventor: Trent Stephen Brown, 938 Hawthorne Dr., Carmel, IN (US) 46033

( * ) Notice: Subject to any disclaimer, the term of this patent is extended or adjusted under 35 U.S.C. 154(b) by 83 days.

(21) Appl. No.: 10/896,823

(22) Filed: Jul. 22, 2004

(65) Prior Publication Data

US 2006/0016663 A1  Jan. 26, 2006

(51) Int. Cl.
  *F16D 43/08* (2006.01)
(52) U.S. Cl. .................................. 192/99 S; 192/105 C
(58) Field of Classification Search ............. 192/105 C
  See application file for complete search history.

(56) References Cited

U.S. PATENT DOCUMENTS

| | | | |
|---|---|---|---|
| 558,844 A * | 4/1896 | Robinson ............... | 192/105 CS |
| 766,552 A * | 8/1904 | Sturtevant et al. ...... | 192/105 C |
| 1,841,284 A * | 1/1932 | Gillett .................... | 192/105 C |
| 1,931,675 A * | 10/1933 | Nutt ......................... | 192/99 A |
| 2,218,379 A * | 10/1940 | Evans .................... | 192/105 C |
| 2,474,324 A * | 6/1949 | Ray ........................... | 73/541 |
| 2,748,913 A | 6/1956 | Binder | |
| 2,846,040 A | 8/1958 | Binder | |
| 3,580,372 A | 5/1971 | Schiefer | |
| 4,046,240 A * | 9/1977 | Schlagmuller et al. .. | 192/104 C |
| 4,206,824 A | 6/1980 | Klink | |
| 4,298,112 A * | 11/1981 | Carstensen ............... | 192/99 A |
| 4,485,905 A | 12/1984 | Radbo | |
| 4,856,637 A | 8/1989 | Gebhart | |
| 4,989,711 A | 2/1991 | Schultz | |
| 5,014,841 A | 5/1991 | Gillespie | |
| 5,785,163 A * | 7/1998 | Bell .......................... | 192/70.3 |
| 6,536,574 B1 | 3/2003 | Fehring | |
| 2003/0183477 A1 | 10/2003 | Chevalier | |

* cited by examiner

Primary Examiner—Rodney H. Bonck
(74) Attorney, Agent, or Firm—P. Derek Pressley (57) ABSTRACT

A throwout bearing lever for a centrifugal clutch having a dynamic adjustable weight assembly. The lever comprises a lever having an assembly aperture through the lever and an adjustment screw aperture in communication with the assembly aperture. A threaded adjustment screw within the adjustment screw aperture has a resilient member seat and an adjusting tool receiving seat. A sliding carrier slideable within the assembly aperture has a fastener aperture through the carrier and a resilient member seat. A weight fastener fastens a weight to the carrier. A resilient member seated against the resilient member seats resiliently biases the carrier against an end of the assembly aperture. The threaded adjustment screw allows for adjustment of the resiliency of the resilient member. The assembly slides within the assembly aperture, changing the weight distribution of the lever effecting movement of the lever during operational movement of the clutch.

8 Claims, 7 Drawing Sheets

THROWOUT BEARING LEVER WITH DYNAMIC ADJUSTABLE WEIGHT ASSEMBLY

BACKGROUND OF THE INVENTION

1. Field of the Invention

The present invention relates generally to automotive transmission clutches and more particularly to centrifugal pressure assist type clutches with adjustable centrifugal loading.

2. Description of the Prior Art

Severe loading created by rapid transfer of power from a vehicle's engine to drive train components is problematic in competitive environments. It has become common to use centrifugal type clutches in these high horsepower applications to control the rate of change of power transfer from an engine to a drive train by allowing slippage between the engine and the drive train. There have been several efforts in the prior art to provide a centrifugal clutch that has means for adjusting the amount of slippage between the engine and the drive train to allow adjustment of the point where the clutch stops slipping. Several previously issued United States patents disclosing centrifugal clutches providing means for adjusting the amount of slippage between the engine and the drive train are described here.

U.S. Pat. No. 3,580,372 issued to Schiefer discloses a centrifugal pressure assist type clutch. The clutch has a plurality of radially disposed release levers pivotally secured to the pressure plate. Each lever has a centrifugal weight to create a moment which is a function of the rotational speed of the lever that tends to pivot the lever about the pivotal connection to the clutch cover and forces the pressure plate against the driven disc. The adjustment of the dynamic loading is effected through movement of the position of the levers' pivot axes on the clutch cover relative to the lever pivot points on the pressure plate and therefore the movement of the lever at a given rotational speed.

U.S. Pat. No. 4,485,905 issued to Radbo et al. discloses a manually disengageable centrifugal clutch having an intermediate plate and a pressure plate that define a plurality of outwardly narrowing spaces for radially movable centrifugal weights spring biased towards the pressure plate. The intermediate plate is suspended on disengagement arms and is movable thereby away from the pressure plate. In one position at a certain distance from the pressure plate, the spaces for the centrifugal weights are widened so much that the weights cannot exert any pressure on the pressure plate. The clutch is thereby disengaged regardless of rotational speed with the disengaging force depending upon the spring force on the intermediate plate.

U.S. Pat. No. 4,989,711 issued to Schultz et al. discloses a controller for a centrifugal clutch with circumferentially spaced actuating weights having radially inwardly projecting actuating arms that pivot rearwardly as the rate of rotation of the clutch accelerates and the weights move to increase actuating pressure in and through the clutch. Supplemental weight means such as nut and bolt assemblies to increase the weight of the levers are disclosed.

U.S. Pat. No. 6,536,574 issued to Fehring discloses a centrifugal clutch with two weighted members that are pivotally mounted to the drive hub. Two spring members are operative between the drive hub and the weighted member to apply a restoring force to the weighted members. Under the influence of centrifugal force generated by the rotation of the drive hub, the weighted members pivots against the resistance of the spring member so as to engage the drive plates and thereby urge the drive plates into engagement with the clutch disc such that the driven member rotates with the drive plates.

U.S. Patent Application Publication No. US2003/0183477 issued to Chevalier discloses a centrifugal clutch for coupling a drive shaft to a driven member at rotary speed above a predetermined threshold having a centrifugal slider with a weight at one end. The slider slides on a frame from an extended radial position to a retracted radial position.

While these previously disclosed centrifugal clutches provide different ways of adjusting the movement of the lever arms operating against the throwout bearing, there remains a need for a throwout bearing lever having dynamic weight movement during operation of the clutch that improves the effectiveness of the centrifugal clutch. To answer this need, the claimed invention provides a throwout bearing lever having a dynamic adjustable weight assembly.

As will be described in greater detail hereinafter, the claimed invention differs from the previously proposed inventions and employs a number of novel features that render it highly advantageous over the aforementioned prior art.

SUMMARY OF THE INVENTION

It is a primary object of the claimed invention to provide a throwout bearing lever for a centrifugal clutch having a dynamic adjustable weight assembly that effects operational movement of the lever by changing weight distribution of the lever during operation of the clutch.

It is another object of the claimed invention to provide a throwout bearing lever with a dynamic adjustable weight assembly having weights independent from the lever so that the weight may easily be changed without disturbing the lever.

It is a further object of the claimed invention to provide a throwout bearing lever with a dynamic adjustable weight assembly having means for adjusting the dynamic movement of the weight assembly during operation of the clutch.

To achieve these objects as well as others that will become evident after a reading of this specification and viewing the appended drawings, a thowout bearing lever with dynamic adjustable weight assemblies is provided. The throwout bearing lever with dynamic adjustable weight assembly generally comprising a lever, a threaded adjustment screw, a sliding carrier, a plurality of weights, a weight fastener and a resilient member. A threaded sleeve and spring pin may be used in place of the sliding carrier. The weight assembly alters weight distribution of the lever effecting movement of the lever during operation of the clutch.

The dynamic adjustable weight assembly is assembled by first placing the sliding carrier into the assembly aperture of the throwout bearing lever. Next, the adjustment screw is screwed into the adjustment screw aperture leaving a portion of the aperture open to the assembly aperture. Next, the spring is then inserted between the sliding carrier and the adjustment screw. Next, a first weight is fastened over the threads of the weight screw so that the weight is adjacent the head of the weight screw. Next, the weight screw is inserted through the weight fastener aperture of the sliding carrier so that the threads of the weight screw protrude out the opposite side of the sliding carrier. Next, another weight is fastened over the threads of the weight screw to complete the assembly.

After the dynamic adjustable weight assembly has been assembled, the adjustment screw is adjusted to change the amount of spring force that the spring will exert upon the sliding carrier. The spring biases the sliding carrier against the second end of the assembly aperture and impedes movement of the weight assembly during operation of the centrifugal clutch.

The dynamic adjustable weight assembly functions to alter the weight distribution of the lever during operation of the clutch. Centrifugal force created during operation of the clutch acts against the throwout bearing levers to pivot the levers toward the throwout bearing. As the centrifugal force increases, the weight of the adjustable weight assembly overcomes the spring force of the spring causing the adjustable weight assembly to move away from the lever arm and toward the pivot point of the throwout bearing lever, effecting movement of the lever by dynamically changing the center of gravity of the lever during operation thereby changing the amount of slippage between the engine and the drive train.

DETAILED DESCRIPTION OF THE PREFERRED EMBODIMENT

Figure 1:
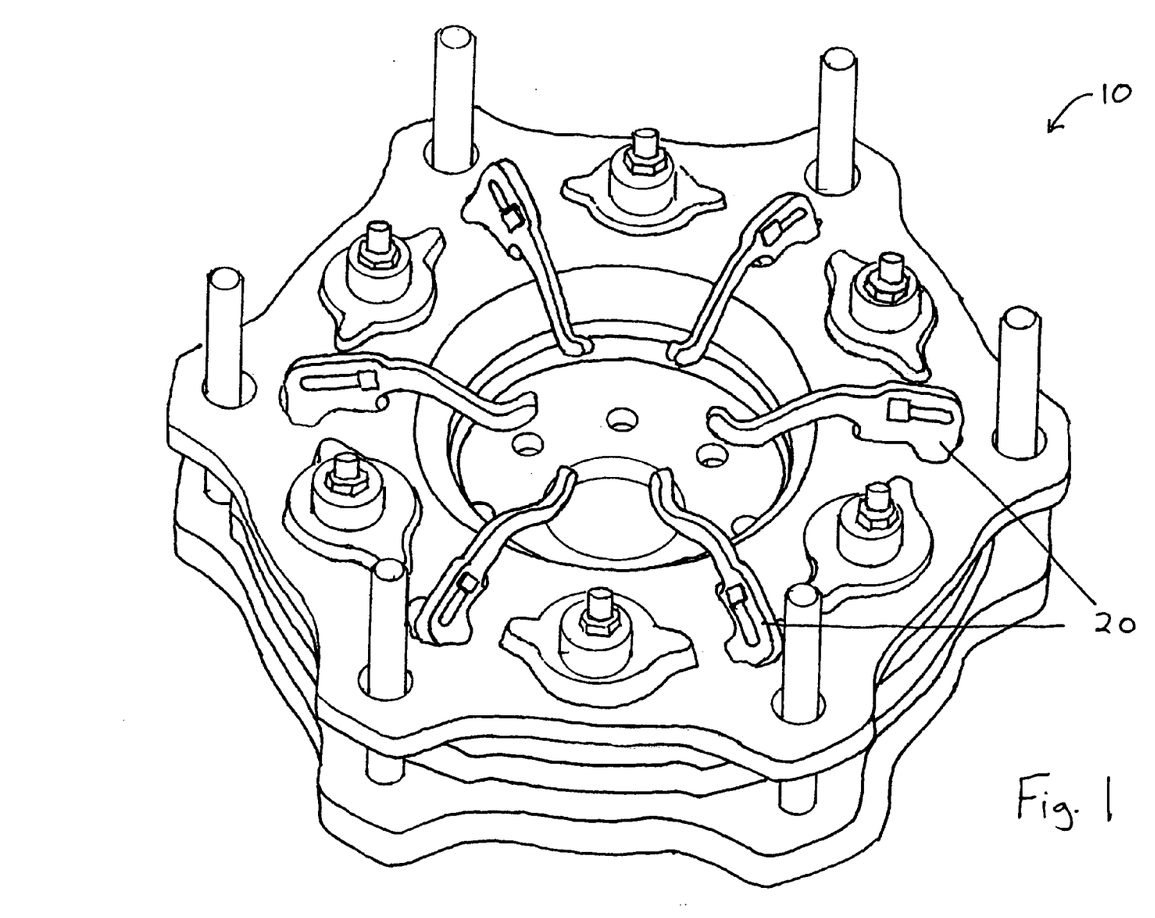
FIG. 1. Shows a perspective view of a centrifugal clutch with throwout bearing levers having dynamic adjustable weight assemblies.

The automotive centrifugal clutch 10 shown in FIG. 1 has a plurality of throwout bearing levers 20 that act against the throwout bearing (not shown) during operation. The throwout bearing lever 20 shown in FIG. 2 has a dynamic adjustable weight assembly 30 generally comprising a lever 40, a threaded adjustment screw 50, a sliding carrier 60, a plurality of weights 70, a weight fastener 80 and a resilient member 90. Another embodiment of the adjustable weight assembly 91 and lever 92 shown in FIG. 3 has a threaded sleeve 93 and spring pin 94 in place of the sliding carrier 60, resin based washers 95 adjacent the weights 96 and a pair of fasteners 97 fastening the washers 95 and weights 96 to the threaded sleeve 92. The weight assembly 30, 91 alters weight distribution of the lever 20, 92 effecting movement of the lever 20, 92 during operation of the centrifugal clutch 10.

Figure 2:
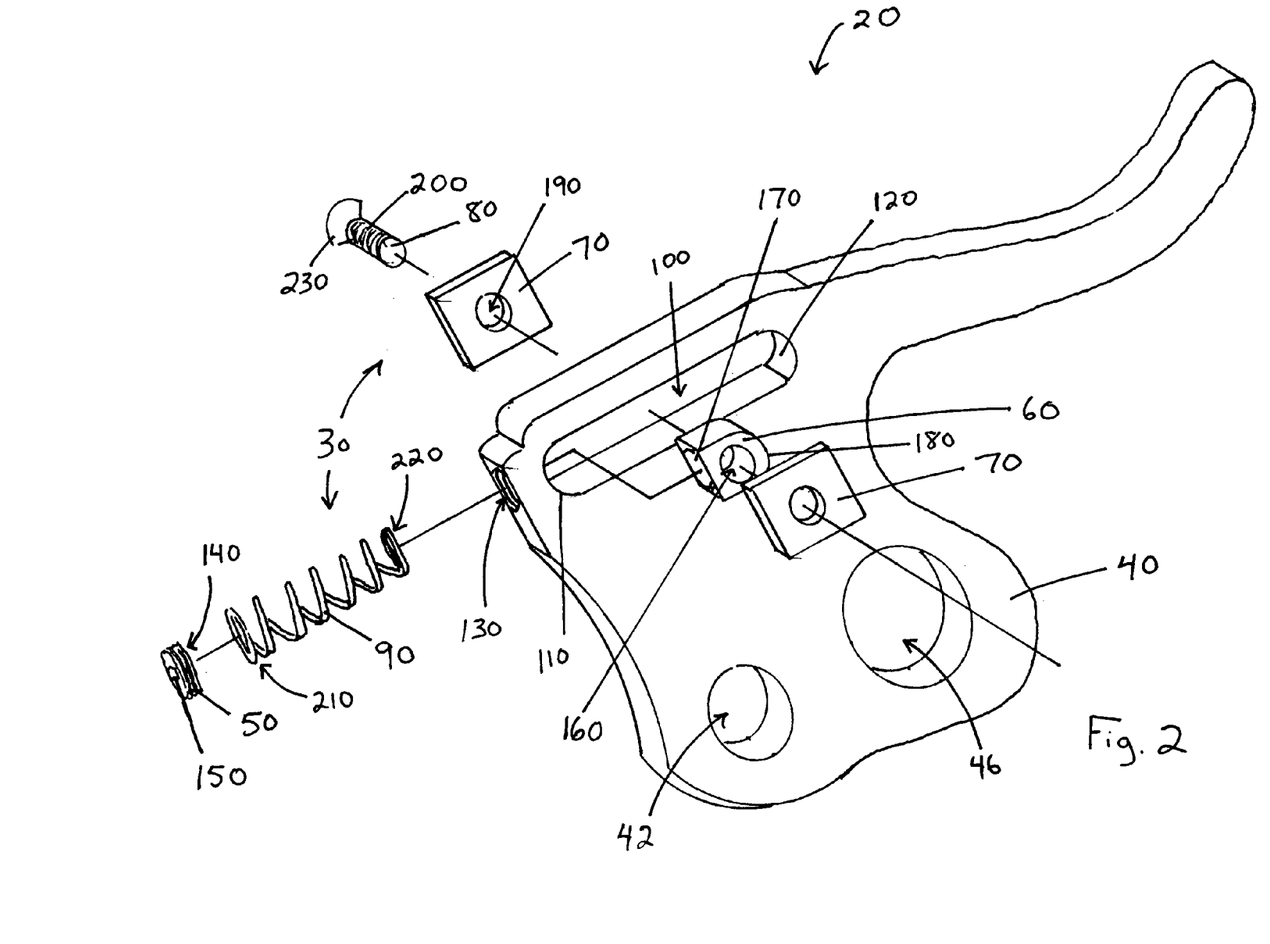
FIG. 2. Shows an exploded perspective view of a throwout bearing lever with dynamic adjustable weight assembly.

The lever 40 shown in FIG. 2 has an assembly aperture 100 with rounded first 110 and second 120 ends to strengthen the integrity of the lever 40 and a threaded adjustment screw aperture 130 in communication with the first end 110 of the assembly aperture 100. The lever also has a pivot pin aperture 42 through which a pivot pin extends and a pressure plate link aperture 46 through which a pressure plate link pin extends. The lever 92 shown in FIGS. 3 and 4 also has a recessed portion 132 adjacen the assembly aperture 100 sized and shaped to receive the washers 95 and weights 96.

The threaded adjustment screw 50 shown in FIG. 2 is screwable within the threaded adjustment screw aperture 130. The threaded adjustment screw 50 has a resilient member seat 140 adjacent the assembly aperture 100. The threaded adjustment screw 50 also has an adjusting tool receiving seat 150 on the side opposite the resilient member seat 140 to receive the tip of an adjusting tool (not shown).

Figure 7:
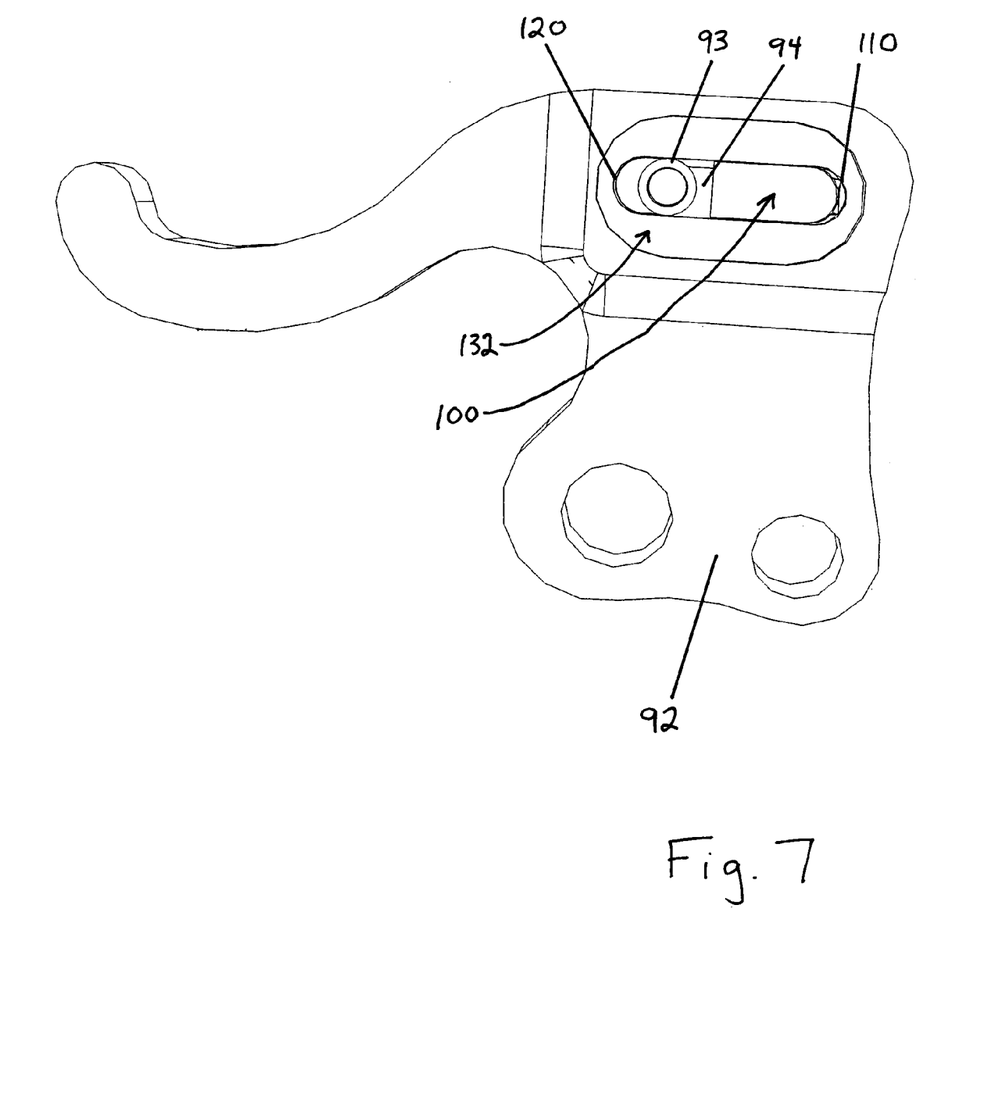
FIG. 7. Shows a side view of the stud and spring pin within the lever.

The sliding carrier 60 shown in FIG. 2 is sized so that it is slideable within the assembly aperture 100 of the lever 40. The sliding carrier 60 has a weight fastener aperture 160 through the sliding carrier 60 and a resilient member seat 170 positioned to be opposite the resilient member seat 140 of the adjustment screw 50. The sliding carrier 60 also has a rounded portion 180 complementary of the rounded second end 120 of the assembly aperture 100 so that the sliding carrier 60 rests firmly against the second end 120 while the clutch 10 is not in operation. The weight assembly 91 shown in FIG. 3 employs a threaded sleeve 93 and spring pin 94 in place of the sliding carrier 60. The threaded sleeve receives the fasteners 97 when assembled and the spring pin 94 is forced against the threaded sleeve by a resilient member (not shown). FIG. 7 shows how the spring pin 94 interacts with the threaded sleeve 93 within the lever 92.

Figure 3:
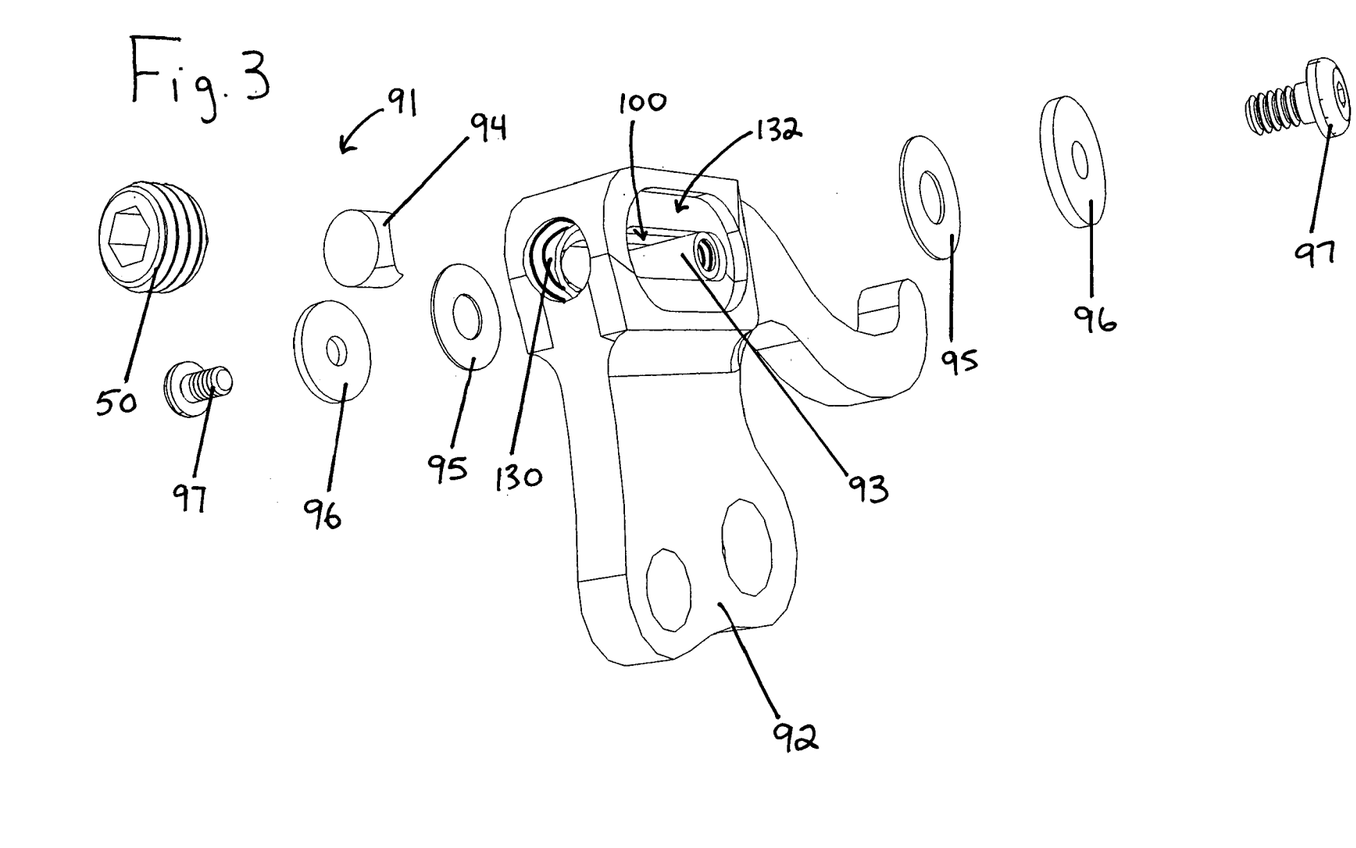
FIG. 3. Shows an exploded perspective view of another embodiment of the throwout bearing lever with dynamic adjustable weight assembly.
Figure 4:
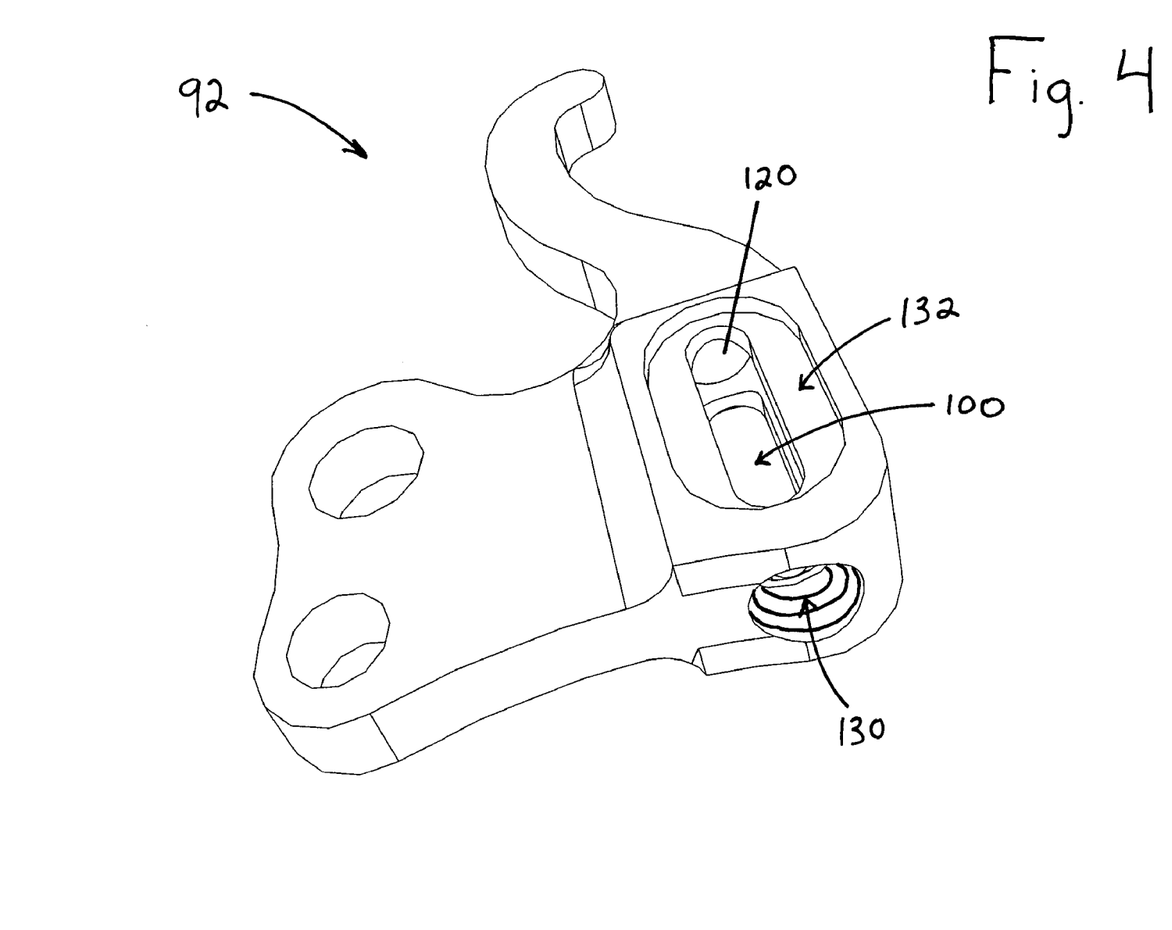
FIG. 4. Shows a perspective view of the lever.
Figure 5:
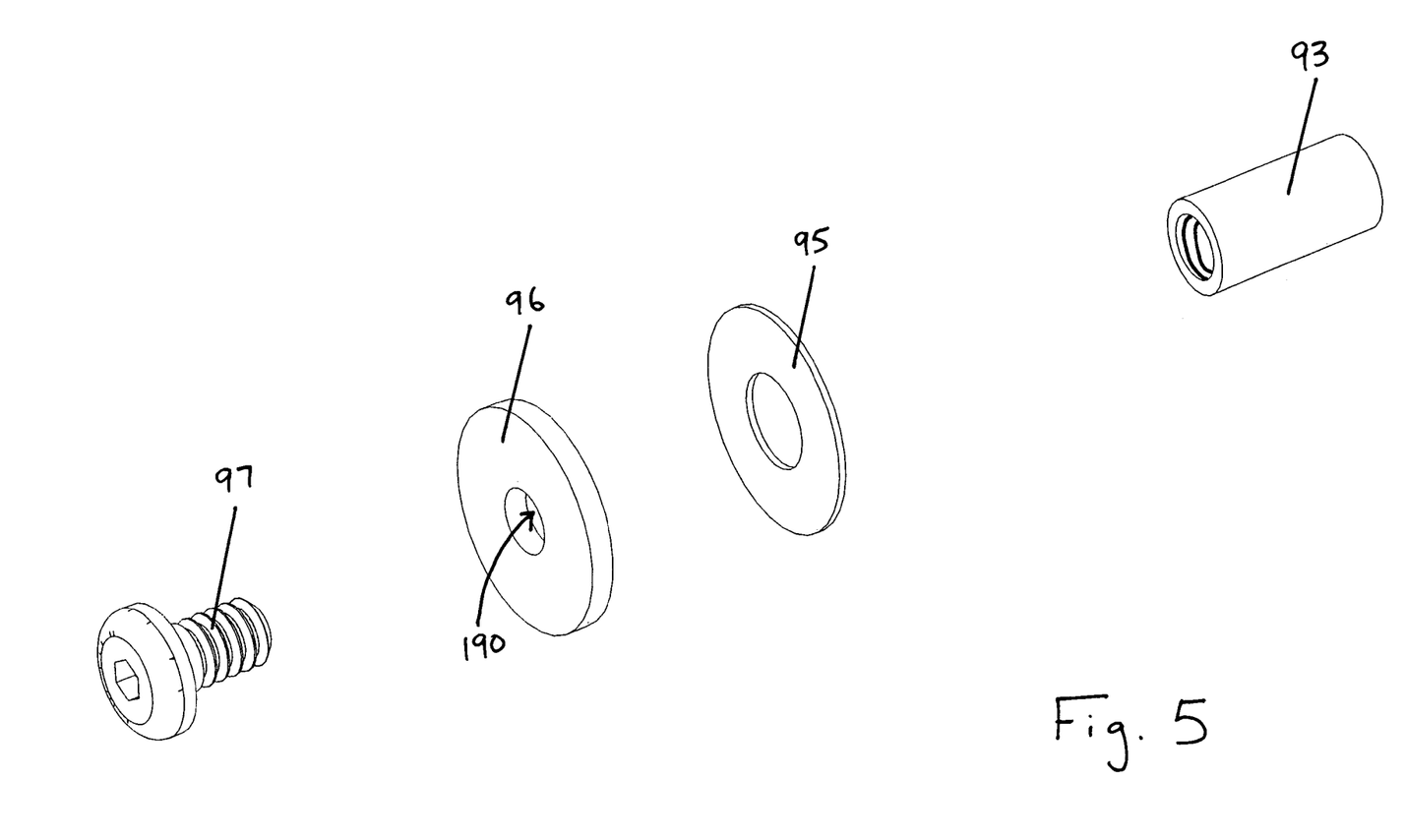
FIG. 5. Shows a perspective view of the cap screw, counter weight, washer and stud of the assembly.
Figure 6:
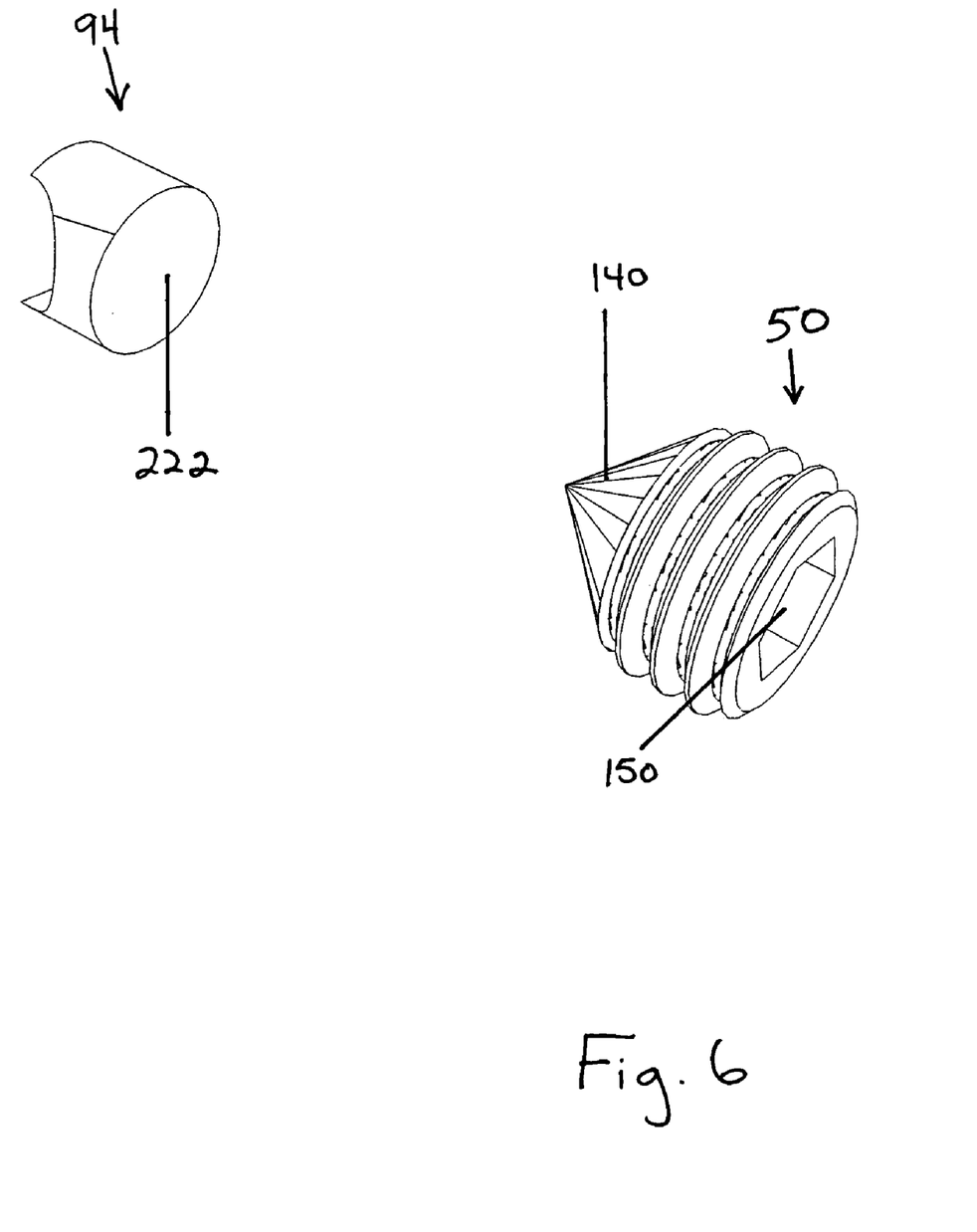
FIG. 6. Shows a perspective view of the spring pin and set screw of the assembly.

The weights 70 shown in FIG. 2 are square and have threaded fastener apertures 190 through the weights 70 to receive the weight fastener 80. However, the weights 70 may be of different size, shape and weight to assist in the adjustability of the dynamic movement of the weight assembly 30 as shown in FIGS. 3 and 5. The weights 70 are positioned on opposite sides of the sliding carrier 60 to retain the sliding carrier 60 within the assembly aperture 100 of the lever 40. The weights 96 shown in FIGS. 3 and 5 are round and are secured adjacent the resin based washers 95 when the fasteners 97 are fastened to the threaded sleeve 93.

The weight fastener 80 shown in FIG. 2 is a weight screw that fastens the weights 70 to the sliding carrier 60. However, the weight fastener 80 could take many different forms such as a rivet or a clip. The weight screw 80 has a set of threads 200 that are mateable with the threaded apertures 190 of the weights 70. The weight assembly 91 shown in FIG. 3 utilizes a pair of fasteners 97 to fasten the washers 95 and round weights 96 to the lever 92 within the recess 132.

The resilient member 90 show in FIG. 2 is a spring. Springs of varying resiliency may be used to add a further means of adjusting the performance of the lever 20. However, the resilient member 90 may take many different forms such as a yieldable solid made of plastic or synthetic rubber. The spring 90 has a first portion 210 seated against the resilient member seat 140 of the adjustment screw 50 and a second portion 220 seated against the resilient member seat 170 of the sliding carrier 60. The second portion 220 of the spring 90 is seated against the resilient member seat 222 when used in conjuction with the weight assembly 91 shown in FIG. 3

The dynamic adjustable weight assembly 30 is preferably assembled by first placing the sliding carrier 60 in the assembly aperture 100 of the throwout bearing lever 40. Next, preferably, the adjustment screw 50 is screwed about half way into the adjustment screw aperture 130 leaving a portion of the aperture 130 open to the assembly aperture 100. Next, preferably, the spring 90 is then inserted between the sliding carrier 60 and the adjustment screw 50 such that the first portion 210 of the spring 90 seats against the resilient member spring seat 140 of the adjustment screw 50 and the second portion 220 of the spring 90 seats against the resilient member spring seat 170 of the sliding carrier 60. Next, preferably, a first weight 70 is fastened over the threads 200 of the weight screw 80 by way of the threaded weight fastener aperture 190 so that the weight 70 is adjacent the head 230 of the weight screw 80. Next, preferably, the weight screw 80 is inserted through the weight fastener aperture 160 of the sliding carrier 60 so that the threads 200 of the weight screw 80 protrude out the opposite side of the sliding carrier 60. Next, preferably, another weight 70 is fastened over the threads 200 of the weight screw 80 by way of the threaded weight fastener aperture 190 to complete the assembly.

The dynamic adjustable weight assembly 91 is preferably assembled by first placing the threaded sleeve 93 in the assembly aperture 100 of the throwout bearing lever 92. Next, preferably, the spring pin is placed adjacent the threade sleeve as shown in FIG. 7. Next, preferably, the adjustment screw 50 is screwed about half way into the adjustment screw aperture 130 leaving a portion of the aperture 130 open to the assembly aperture 100. Next, preferably, the spring 90 is then inserted between the adjustment screw 50 and the spring pin 94 such that the firt portion 210 of the spring seats against the resilient member spring seat 140 of the adjustment screw and the second portin 220 of the spring 90 seats against the resilient member spring seat 222 fo the spring pin 94. Next, preferably, a round weight 96 and a washer 95 are assembled upon the fastener 97. Next, preferably, the fastener 97 is fastened within the threaded sleeve 93 to secure the weight and washer within the recess 132 of the lever 92. Finally, preferably, the weight and washer assembly process is then repeated for the opposite side of the threaded sleeve 93 and lever 92.

The threaded adjustment screw 50 provides means for adjusting the resiliency of the spring 90 by manipulating the distance between the resilient member seat 140 of the adjustment screw 50 and the resilient member seat 170 of the sliding carrier 60 thereby adjusting the spring force of the spring 90. After the dynamic adjustable weight assembly 30 has been assembled, the adjustment screw 50 is adjusted to change the amount of spring force that the spring 90 will exert upon the sliding carrier 60. The spring 90 biases the sliding carrier 60 against the second end 120 of the assembly aperture 100 and impedes or dampens movement of the weight assembly 30 during operation of the centrifugal clutch 10.

Centrifugal force created during operation of the centrifugal clutch 10 acts against the throwout bearing levers 20 to pivot the levers 20 toward the throwout bearing (not shown). In the past, it was commonplace to add weight to the throwout bearing levers so as to effect the way in which the levers moved in response to the centrifugal force. This was commonly done by placing a hole through the lever and then fastening a nut and bolt through the hole, thereby changing the weight and weight distribution of the lever. The dynamic adjustable weight assembly 30 of the claimed invention provides several improvements over this common method as well as other methods previously employed.

Previously, the weight added to the lever was stationary. In contrast, the dynamic adjustable weight assembly 30 functions to alter the weight distribution of the lever 20 during operation of the clutch 10. As the centrifugal force changes during operation of the centrifugal clutch 10, the adjustable weight assembly 30 shifts between the first 110 and second 120 ends of the assembly aperture 100, thereby continually changing the center of gravity of the lever 20 and effecting the way the lever 20 moves in response to the pull of the centrifugal force.

The claimed invention also contributes a totally different aspect of adjusting the behavior of the throwout bearing levers by providing means for adjusting the amount of movement the weight assembly 30 makes during operation of the clutch. Adjustment of this aspect alone can produce a difference in the operation of the centrifugal clutch 10 and presents a different variable that may be utilized to increase the overall performance of the centrifugal clutch 10.

The claimed invention also contributes the further improvement of providing a weight assembly 30 that allows easy adjustment of the amount of weight the adjustable weight assembly 30 holds. Previously, the weight employed to increase the overall weight of the lever was either directly incorporated into the lever itself or provided limited adjustment through the use of nut and bolt assemblies as previously stated. In contrast, the adjustable weight assembly 30 of the claimed invention provides an assembly that can easily be manipulated to carry more or less weight without substantial change to the lever itself.

Although the invention has been described by reference to some embodiments it is not intended that the novel device be limited thereby, but that modifications thereof are intended to be included as falling within the broad scope and spirit of the foregoing disclosure, the following claims and the appended drawings.

I claim:

1. A throwout bearing lever for a centrifugal clutch having a dynamic adjustable weight assembly, the lever comprising:
   a lever having an assembly aperture through the lever with a first end and a second end;
   a threaded adjustment screw aperture in communication with the first end of the assembly aperture;
   a threaded adjustment screw screwable within the threaded adjustment screw aperture having a first resilient member seat and an adjusting tool receiving seat;
   a sliding carrier slideable within the assembly aperture having a first weight fastener aperture through the sliding carrier and a second resilient member seat;
   a weight having a second weight fastener aperture through the weight;
   a weight fastener fastening the weight to the sliding carrier; and
   a resilient member having a first portion seated against the first resilient member seat and a second portion seated against the second resilient member seat, the resilient member resiliently biasing the sliding carrier against the second end of the assembly aperture, the threaded adjustment screw providing means for adjusting the resiliency of the resilient member.

2. The lever of claim 1 further comprising a second weight with a third weight aperture through the second weight, the first and second weights positioned on opposite sides of the sliding carrier retaining the sliding carrier within the assembly aperture of the lever.

3. The lever of claim 2 wherein the resilient member is a spring within the assembly aperture, manipulation of the adjustment screw changing the distance between the first resilient member seat and the second resilient member seat adjusting spring force of the spring.

4. The lever of claim 3 wherein the fastener is a screw having threads mateable with threads within the second weight fastener aperture of the weight and threads within the third weight fastener aperture of the second weight.

5. A throwout bearing lever for a centrifugal clutch having a dynamic adjustable weight assembly, the lever comprising:
   a lever having an assembly aperture through the lever with a first end and a second end;
   a threaded adjustment screw aperture in communication with the first end of the assembly aperture;

a threaded adjustment screw screwable within the threaded adjustment screw aperture having a first resilient member seat and an adjusting tool receiving seat;

a sliding sleeve slideable within the assembly aperture having a first weight fastener aperture through the sliding sleeve;

a spring pin slideable within the assembly aperture seated against the sliding sleeve having a second resilient member seat;

a weight having a second weight fastener aperture through the weight;

a weight fastener fastening the weight to the sliding sleeve;

a washer between the weight and the assembly aperture;

a resilient member having a first portion seated against the first resilient member seat and a second portion seated against the second resilient member seat, the resilient member resiliently biasing the sliding sleeve and spring pin against the second end of the assembly aperture, the threaded adjustment screw providing means for adjusting the resiliency of the resilient member.

6. The lever of claim 5 further comprising a second weight with a third weight aperture through the second weight, the first and second weights positioned on opposite sides of the sliding sleeve retaining the sliding sleeve and spring pin within the assembly aperture of the lever.

7. The lever of claim 6 wherein the resilient member is a spring within the assembly aperture, manipulation of the adjustment screw changing the distance between the first resilient member seat and the second resilient member seat adjusting spring force of the spring.

8. The lever of claim 7 wherein the fastener is a screw having threads mateable with threads within the second weight fastener aperture of the weight and threads within the third weight fastener aperture of the second weight.

* * * * *